Aug. 14, 1923.
J. H. STERN
1,465,065
ADJUSTING DEVICE
Filed Nov. 29, 1921
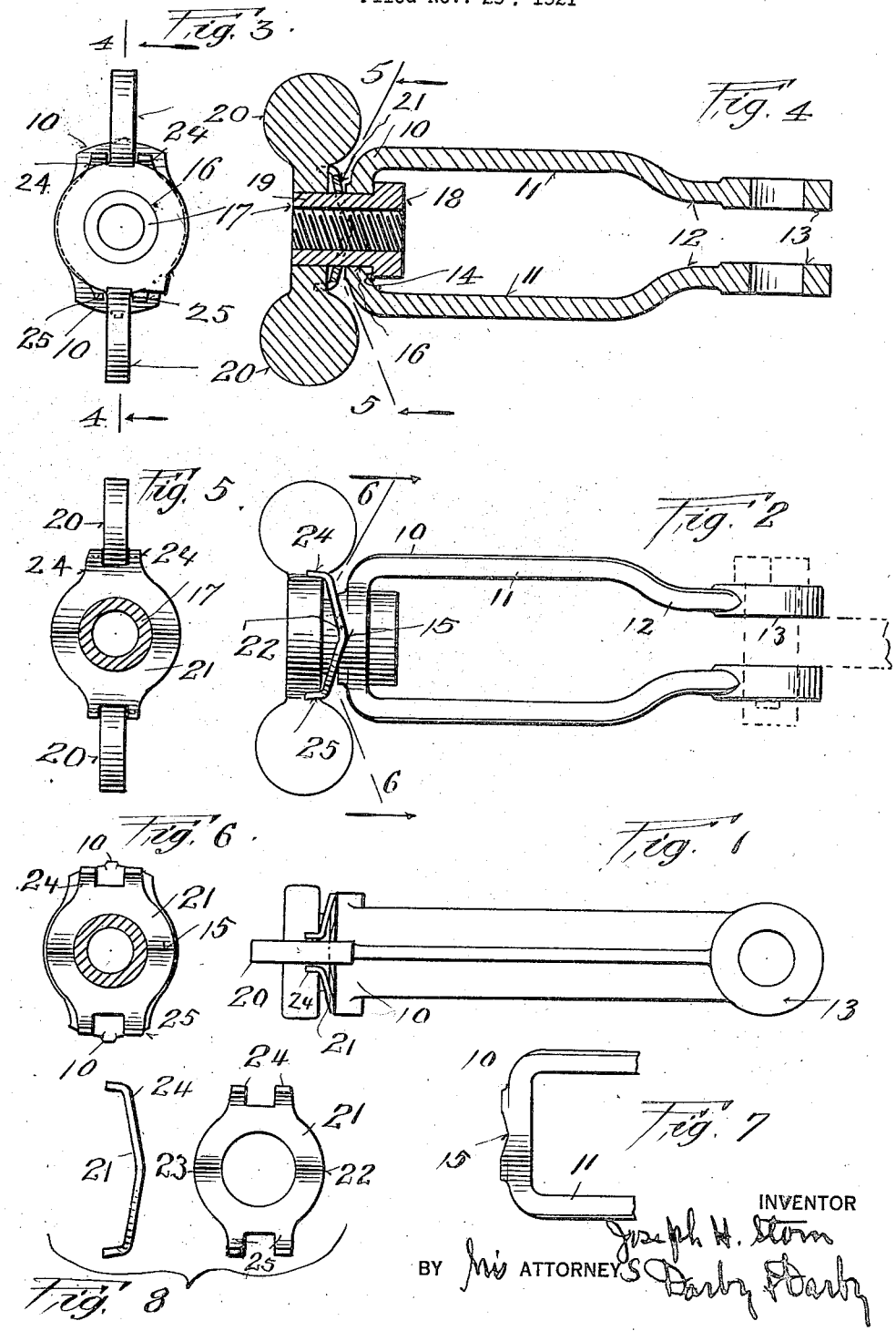
INVENTOR
Joseph H. Stern
BY his ATTORNEYS
Darby & Darby Patented Aug. 14, 1923.

1,465,065

UNITED STATES PATENT OFFICE.

JOSEPH H. STERN, OF PATERSON, NEW JERSEY, ASSIGNOR TO M. J. FORD MANUFACTURING COMPANY, OF HOBOKEN, NEW JERSEY, A CORPORATION OF NEW JERSEY.

ADJUSTING DEVICE.

Application filed November 29, 1921. Serial No. 518,566.

*To all whom it may concern:*

Be it known that I, JOSEPH H. STERN, a citizen of the United States, residing in the city of Paterson, county of Passaic, and State of New Jersey, have made a certain new and useful Invention in Adjusting Devices, of which the following is a specification.

This invention relates broadly to mechanism for adjusting the lengths of connecting links, tie rods, and the like, and more specifically to linkage connection adjustment for automobile brakes, or similar structure.

Among the objects of the invention is included the provision of mechanism of the character described whereby connecting linkage can be manually adjusted without the necessity of disconnecting any of the link or rod connections.

A further object includes the provision of a simple, reliable and efficient adjusting device for the purpose stated, which is provided with an automatically operating safety holding mechanism.

Other objects will appear hereinafter, and I attain these objects by the device illustrated in the accompanying drawing, of which Fig. 1 is a plan view;
Fig. 2 is a side elevation;
Fig. 3 is an end view;
Fig. 4 is a sectional view taken on the lines 4—4 of Fig. 3;
Fig. 5 is a view taken on the lines 5—5 of Fig. 4, looking in the direction of the arrows;
Fig. 6 is a view taken on the lines 6—6 of Fig. 2, also looking in the direction of the arrows;
Fig. 7 is a view of a portion of the holding clevis; and
Fig. 8 shows the seating spring.

Similar numerals refer to like parts throughout the several views.

My invention is illustrated by the drawings as applied to the conventional automobile brake mechanism, and includes a yoke, or clevis, 10, having a pair of parallel arms 11, which terminate in contracted portions 12, with ears 13, on the one hand, and in an annular swivel seat 14, with a spring catch, or holding seat 15, on either side, and adjacent the opening 16, on the other. The ears 13 may be provided with the usual bracket, or crank, connection, as is well understood, and which forms no part of my invention.

Within the opening 16, there is fitted a swivel nut 17, which, as shown, is smooth on the outer surface, and threaded on the inner surface, and is provided with a head or enlargement 18, resting on the shoulder 14, and an elongated neck 19, passing through the opening 16. On this neck extension there is tightly shrunken or otherwise fastened, thumb wings 20, for rotating the swivel nut within its opening, for the purpose of taking up slackness in the rod, or for adjusting the said connections.

In order to guard against accidental loosening or other improper adjustment of said connections, I have provided a spring catch and holding device, or arrangement 21. This holding device comprises a spring washer of the shape and contour indicated best in Fig. 8. In its simplest form said holding washer is provided with peaks or raised portions 22 and 23, on diametrically opposite sides, for engaging with holding seats 15, 15, on the adjusting clevis, and with a pair of clamping fingers 24 and 25, for engaging the thumb wings of the swivel nut, and rotates therewith. This washer fits on the neck 19, and is held under proper tension between its seat and the thumb wings when the device is assembled and ready for use.

From the above description, it is readily seen that as the swivel nut is turned to take up slackness in the connections, or for otherwise adjusting said adjustment, the holding spring washer travels with the swivel and thumb wings, and thus the peaks are moved from their seats, and will slide along the bearing surface until they again become seated, thus affording a readily adjusting and automatic holding device.

While I have described my invention in connection with use on an automobile brake mechanism, it is evident that the same is equally well adapted for use with other connecting rods where it is desirable to adjust the length of said rods. It is further understood that while I have described a specific embodiment of my invention, the same is not to be thus limited, as obviously various modifications will suggest themselves to those versed in the art, falling wholly within the scope and spirit of my invention.

What I claim, therefore, as new and useful, and of my own invention, and desire to secure by Letters Patent, is:

1. In an adjusting mechanism of the kind described, a holding link provided with an opening therein, a swivel seat surrounding said opening on one side of said link wall, and a securing adjusting seat adjacent said opening on the other side of the link wall.

2. In an adjusting mechanism of the kind described, a holding link provided with an opening therein, a swivel seat surrounding said opening on one side of said link wall, and a securing adjusting seat adjacent said opening on the other side of the link wall, a swivel nut mounted within said opening, and means on said nut for holding the same against rotation.

3. In an adjusting mechanism, a stationary link member, a revoluble holding and adjusting member pivotally mounted in said stationary member, means extending from said holding and adjusting member for turning the same, and means carried on said extending means for engaging the stationary member.

4. In an adjusting mechanism, a stationary link member having an opening therethru, a revoluble holding and adjusting member pivotally mounted in said opening, and resilient-holding means carried by the revoluble member for engaging the stationary member.

In testimony whereof I have hereunto set my hand on this 5th day of November A. D., 1921.

JOSEPH H. STERN.